(No Model.)  3 Sheets—Sheet 1.
C. F. ROPER.
MACHINE FOR MAKING SPINNING RINGS.
No. 333,256.  Patented Dec. 29, 1885.
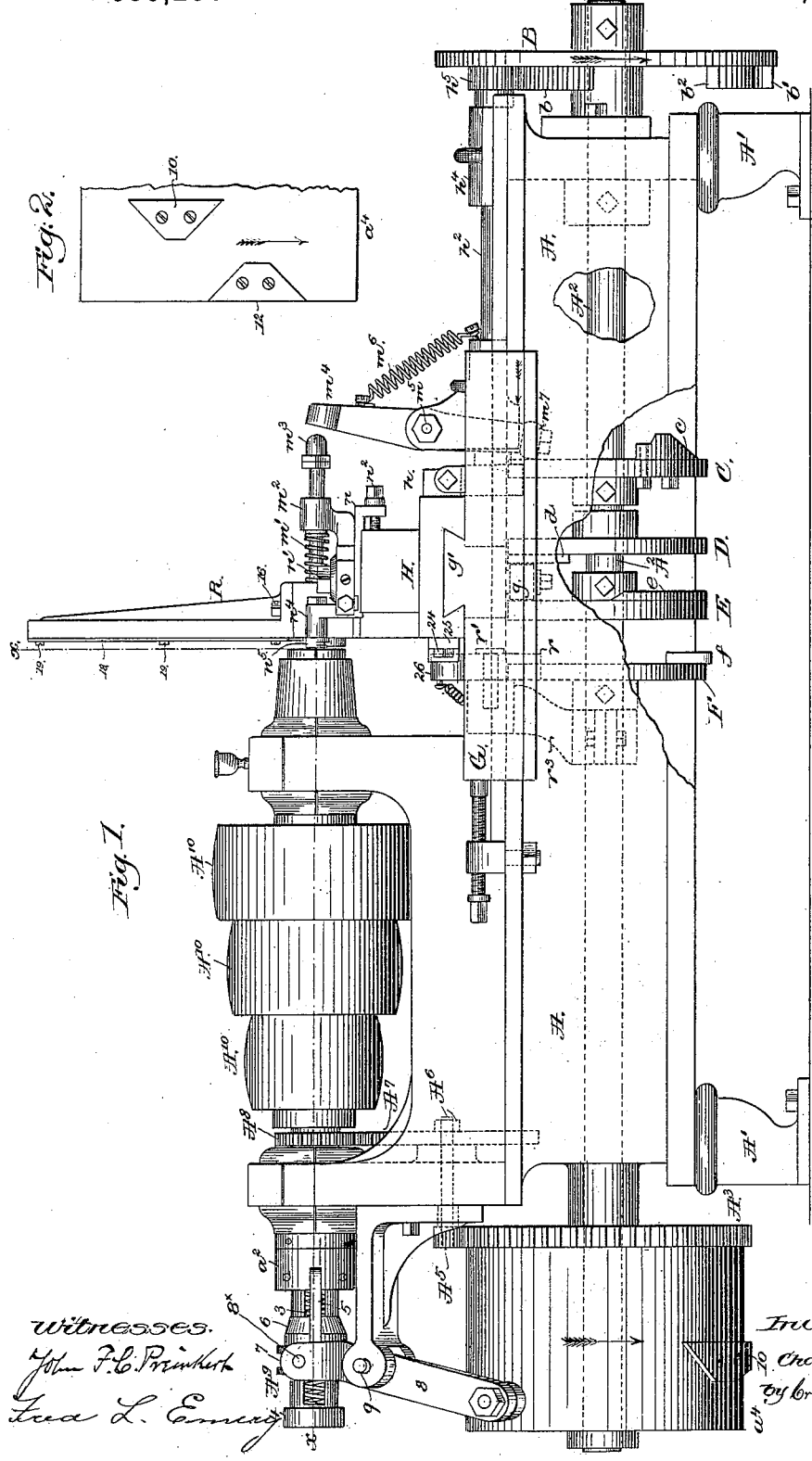

(No Model.) 3 Sheets—Sheet 2.
C. F. ROPER.
MACHINE FOR MAKING SPINNING RINGS.
No. 333,256. Patented Dec. 29, 1885.
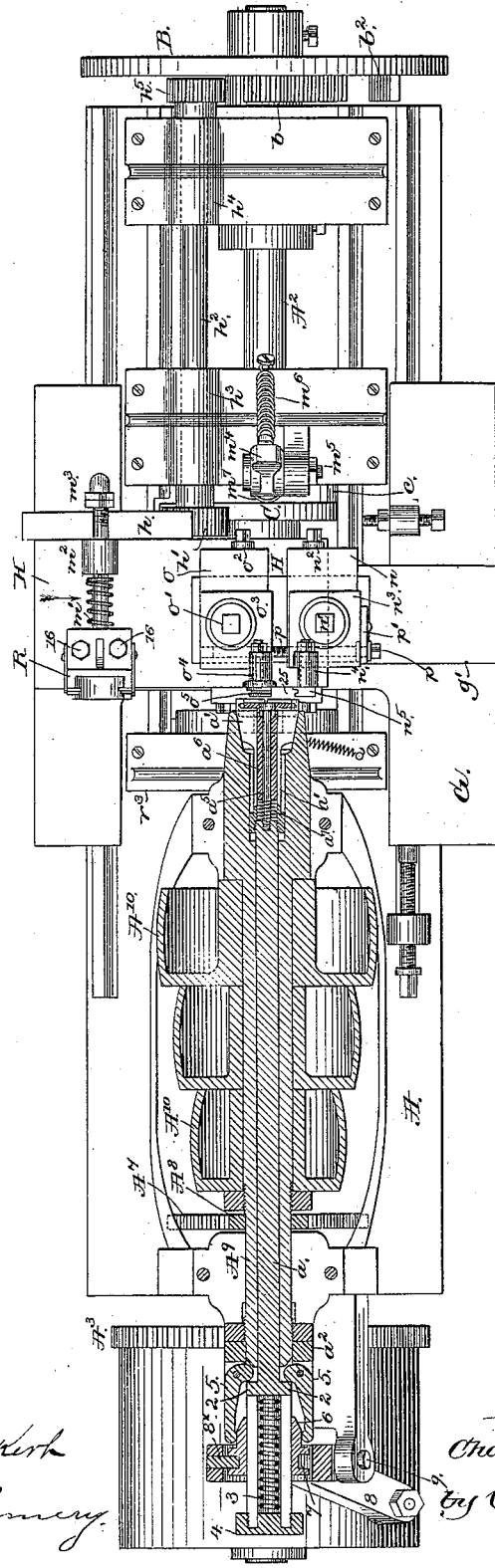
Witnesses.
John F. C. Prinkirk
Fred L. Emery
Inventor:
Charles F. Roper.
by Crosby Gregory
attys.

(No Model.) 3 Sheets—Sheet 3.
C. F. ROPER.
MACHINE FOR MAKING SPINNING RINGS.
No. 333,256. Patented Dec. 29, 1885.
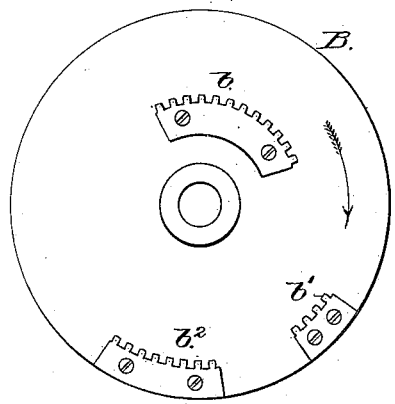
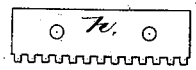
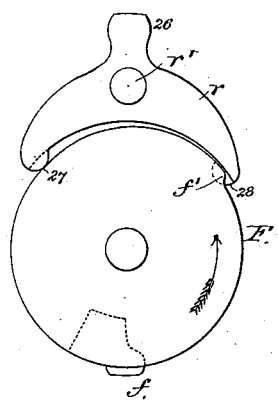
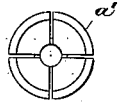
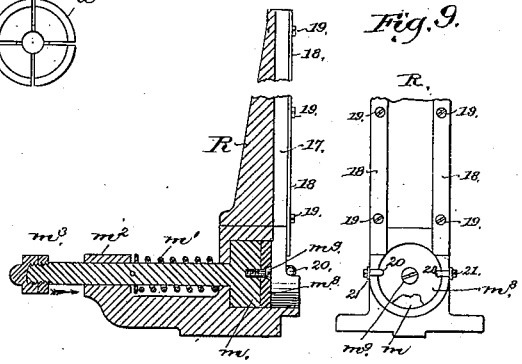
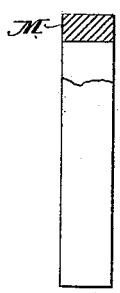
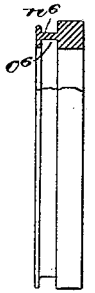
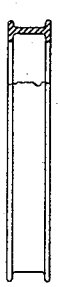
Witnesses
John F. C. Pinkleth
Fred L. Emery
Inventor
Charles F. Roper
by Crosby Gregory
attys.

UNITED STATES PATENT OFFICE.

CHARLES F. ROPER, OF HOPEDALE, MASSACHUSETTS, ASSIGNOR TO GEORGE DRAPER & SONS, OF SAME PLACE.

MACHINE FOR MAKING SPINNING-RINGS.

SPECIFICATION forming part of Letters Patent No. 333,256, dated December 29, 1885.

Application filed October 26, 1885. Serial No. 180,944. (No model.)

*To all whom it may concern:*

Be it known that I, CHARLES F. ROPER, of Hopedale, county of Worcester, and State of Massachusetts, have invented an Improvement in Machines for Manufacturing Rings for Spinning, of which the following description, in connection with the accompanying drawings, is a specification, like letters on the drawings representing like parts.

This invention has for its object the construction of an organized machine for automatically shaping rings for spinning.

In the manufacture of spinning-rings as heretofore practiced the annular blanks of substantially uniform thickness have been by hand supplied to a revolving chuck, where they have been acted upon and shaped both externally and internally by tools held by a cross-slide mounted upon a movable carriage, the latter being operated by hand. The machines referred to, fed by hand and actuated by hand to place the carriage and its cross-slide in operative position, require the constant attention of an attendant. To obviate this I have provided means whereby the blanks are automatically transferred from a raceway or chute into the chuck, and I have also made the movement of the carriage entirely automatic.

My invention in machines for the manufacture of rings for spinning consists, essentially, in a rotating chuck, combined with a raceway or chute to receive the blanks, a cross-slide to which the raceway is attached, a carriage on which the cross-slide is mounted, and an ejector to transfer the blank from the open lower end of the raceway or chute directly into the chuck, substantially as will be described.

Other features of my invention will be pointed out in the claims at the end of this specification.

Figure 1 in side elevation represents a machine for shaping rings, the said machine embodying my invention. Fig. 2 is a detail of the cam for operating the chuck. Fig. 3 is a partial horizontal section of Fig. 1 in the irregular dotted line $x\,x$. Fig. 4 is a detail of the mutilated gear instrumental in moving the slide longitudinally on the carriage; Fig. 5, a detail of the rack attached to the slide, the teeth of the rack not being shown in the other figures. Fig. 6 is a detail of the cam and lever for moving the slide while the tools are operating upon the blank held by the chuck. Fig. 7 is a front end view of the spring-collet of the chuck. Fig. 8 is a vertical section of the raceway or chute and its ejector; Fig. 9, a front end view of the same partially broken off. Fig. 10 shows a blank for the production of a ring. Fig. 11 shows the ring about half completed, and Fig. 12 a completed ring.

The bed A of the machine, mounted upon suitable legs, A', has bearings for the reception of the cam-shaft $A^2$, which, as herein shown, is rotated from the hollow spindle $A^9$, provided with the belt-pulleys $A^{10}$, by the gears $A^8\,A^7$, shaft $A^6$, and gear $A^5$, which engages the gear $A^3$, fast on the cam-shaft.

I do not desire to limit my invention to the particular mechanism herein shown for rotating the cam-shaft from the hollow spindle $A^9$, and instead thereof I may employ any other mechanism commonly used in lathes to rotate the cam-shaft from the hollow spindle. The hollow spindle $A^9$ contains a slide-rod, $a$, to the forward end of which is attached the spring-collet $a'$, which, as herein shown, is made (see Fig. 7) to present four jaws. The outer side of the collet is made tapering to fit the conical interior of the front end of the hollow spindle, (see Fig. 3,) the said spindle, slide-rod, and collet constituting the chuck. The slide-rod at opposite points has lugs 2, to enter longitudinal slots in the hollow spindle $A^9$, a spring, 3, acted upon at one end by a cap, 4, screwed upon the rear end of the hollow spindle, normally holding the slide-rod forward in the said spindle and the chuck relaxed or open. The spindle $A^9$ has fast on it a collar, $a^2$, upon which are pivoted the two levers 5 5, which are acted upon by the wedge 6 whenever it is desired to close the chuck, the outward movement of the long ends of the levers 5 5 acting to draw the slide-rod and its attached spring-collet into the hollow spindle. The wedge is provided with an annular groove, 7, which is entered by a pin, $8^\times$, at the forked upper end of the lever 8, pivoted at 9, and actuated at the proper times by the cams 10 12 on the cam-hub $a^4$, fast on the cam-shaft.

In the drawings, Fig. 1, the lever 8 is shown as left in the position it will occupy after being struck by the cam 10. The slide-rod $a$ at its forward end, located within the spring-collet, has attached to it a guide, $a^5$, having a large head, the said guide receiving upon it the ring-discharging device $a^6$, made as a sleeve having at one end a flange or head which fits loosely the interior of the spring-collet when the latter is closed, as in Fig. 3, the discharging device at such time being thrust back by the blank held between the spring-jaws of the collet, the spring $a^7$ at the rear of the discharging device, and surrounding the guide $a^5$, being at such time compressed; but as soon as the jaws of the collet are opened in the forward movement of the slide-rod $a$ the discharging device, acted upon by the spring $a^7$, operates to discharge the completed ring from between the jaws of the collet. The cam-shaft $A^2$ has fast upon it a mutilated gear composed of the disk B (see Fig. 4) and a series of toothed segments, $b\ b'\ b^2$, the cam-shaft $A^2$ having also fast upon it a disk, C, provided with a side cam, $c$, two disks, D E, provided, respectively, with side cams, $d\ e$, and a scroll-shaped disk, F, provided with a cam projection, $f$. The bed of the frame, at its upper side, has suitable ways, which receive upon it a carriage, G, provided at its under side with a stud and roll, $g$, (shown in dotted lines,) the said stud or roll being extended between the two cams $d\ e$, so that the said cams in the rotation of the disks act in succession upon the roll, and move the carriage first in one and then in the opposite direction, the movement of the carriage in the direction of the arrow in Fig. 1 bringing the said carriage into proper position to enable the tools held by the cross-slide H to operate upon and shape the blank held by the chuck. The carriage at its upper side has a dovetailed projection, $g'$, over which is fitted the cross-slide H, the base of which has a correspondingly-shaped groove. The cross-slide at one side is provided with a rack, $h$, (shown detached in Fig. 5,) which is engaged by a pinion, $h'$, on the end of a shaft, $h^2$, mounted in bearings $h^3\ h^4$, attached to the bed, the said shaft at its opposite end having a pinion, $h^5$, which is rotated during each rotation of the mutilated gear B.

In the shaping of a blank for a ring the pinion $h^5$ is struck by the toothed segment $b^2$, and then by the toothed segments $b'$ and $b$ in succession, the toothed segments $b^2\ b$ serving to impart to the cross-slide a movement in the direction of the arrow thereon in Fig. 3, the movement being sufficient to place the raceway or chute R, mounted on the said cross-slide, into a position opposite the end of the spring-collet, so that the lowermost blank in the said raceway or chute may be transferred from the said raceway or chute through its open front by means of an ejector, $m$. (See Fig. 8.) The shank of said ejector is extended through the raceway and through a spring, $m'$, and a bearing, $m^2$, and has applied to it, preferably, a hub, $m^3$, which is struck by the end of the lever $m^4$, pivoted at $m^5$, and provided with a spring, $m^6$, the latter acting to keep the roll $m^7$ at the lower end of the lever pressed toward the disk C, so as to be struck by the cam projection $c$ thereon immediately after the cross-slide is brought into position opposite the open chuck, the lever $m^4$ effecting the movement of the ejector in the direction of the arrow, Fig. 8, causing the blank in the raceway or chute to be thrust into the chuck. The lowermost blank in the raceway is transferred into the chuck while the latter is in rotation, and to provide for this and obviate disturbances due to friction I have provided the end of the ejector with a hardened steel disk or washer, $m^8$, which is connected to the ejector loosely by the screw $m^9$, this disk or washer turning readily with the blank as the latter is grasped by the chuck, or as the spring-collet is closed upon it.

The raceway or chute attached to the cross-slide by bolts 16, as shown, has a metal block grooved vertically at its face, as at 17, for the reception of blanks, such as shown by the letter M, Fig. 10—thin plates 18, attached to the block by screws 19, retaining the blanks in the raceway. The plates 18 do not extend, however, to the lower end of the block, but are terminated at a point near the upper side of the ejector, thus leaving the lower front portion of the raceway or chute open to permit the blank to be readily pushed out horizontally by the ejector. Pins 20 at the ends and spring 21 act to detain the lowermost blank in position, so that it cannot be displaced until positively acted upon by the ejector. The cross-slide H, at its upper side, is provided with tool-carrying slides $n\ o$, each being fitted into a groove at the upper side of the upright portion of the cross-slide, the said tool-carrying slides being held in place on the upright portion of the cross-slide by screws $n'\ o'$, extended through an elongated slot (not shown) in the said tool-carrying slides, the latter being made adjustable in the direction of the length of the bed A by the adjustable screws $n^2\ o^2$. The tool-carrying slide $n$ has mounted upon it a plate, $n^3$, having an ear, $n^4$, through which is extended the shank of the tool $n^5$, of usual shape, which is employed to shape the outer side of the ring, it cutting the groove shown at $n^6$, Fig. 11. The tool-carrying slide $o$ has mounted upon it a plate, $o^3$, provided with an ear, $o^4$, in which is placed the shank of the tool $o^5$, employed to cut the inner groove, $o^6$, of the ring, as shown in Fig. 11. The plates $n^3\ o^3$ are respectively held in position with relation to the tool-carrying slides $n\ o$ by means of the bolts $n'\ o'$, before referred to, which are extended through openings in the said plates of greater diameter than the shanks of the bolts, and the said plates are made adjustable toward and from each other, to adapt the tools to the size of the blank to be operated upon by means of the screw $p$. The screw $p$ (see Fig. 3) has a collar provided with an annular groove, which receives a finger, $p'$, attached to the plate $n^3$, the threaded part of the screw entering the threaded part of the plate $o^3$. It will be seen that the screw $p$, held as described, may rotate with relation to the plate $n^3$ to move longitudinally in the said plate, and, as a consequence, if the tool $n^5$ is in proper position, the bolt $o'$ may be loosened, and thus the rotation of the screw will move the plate $o^3$ and tool $o^5$ into proper position; but, on the contrary, should the tool $o^5$ be in proper position, the loosening of the bolt $n'$ and the rotation of the screw $p$ will effect the movement of the plate $n^3$ and its tool $n^5$ into proper position with relation to the blank to be shaped. The blank having been transferred from the raceway or chute by the ejector $m$, the toothed segment $b$ in the continued rotation of the disk B will act upon the gear $h^5$ and reverse the rotation of the shaft $h^2$ and return the cross-slide and its attached raceway or chute into substantially the position shown in the drawings. The cross-slide H, at its side next the chuck, has attached to it by bolts 24 a plate, 25, which, near its center, is slotted to receive the upper end, 26, of the lever $r$, pivoted upon the stud $r'$, inserted in a block, $r^3$, fixed to the frame A. The lever $r$ has a toe, 27, which acts upon the scroll-shaped periphery of the disk F, the heel of the scroll terminating at $f'$, the lever $r$, while the scroll-shaped part of the cam works against the said toe 27, effecting the movement of the cross-slide to force the tools into the blank. After the blank has been fully shaped at its outer and inner sides, as in Fig. 12, the cross-slide is quickly regulated to remove the tools from the blank by means of the cam projection $f$, which strikes the toe 28 of the lever $r$, the said toe being somewhat offset or located in a different plane from that occupied by the toe 27.

I claim—

1. In a machine for the manufacture of rings, the rotating chuck, the cross-slide, and the raceway or chute thereon open at the lower end of the side next the chuck, combined with the ejector to push a blank from the raceway into the chuck, substantially as described.

2. The carriage, the cross-slide mounted thereon, the raceway open at one side, the ejector, and the chuck, combined with means, substantially as described, to move the carriage toward and from the chuck to move the cross-slide on the carriage, to operate the ejector to push a blank from the raceway directly into the chuck, and with means, substantially as described, to operate the chuck.

3. The cross-slide, the tool-carrying slides $n$ $o$, the plates $n^3$ $o^3$, mounted thereon, and their tools $n^5$ $o^5$, combined with a screw, $p$, to adjust the said plates and tools, substantially as described.

4. The carriage, the cross-slide, the raceway mounted thereon; and the ejector carried by the cross-slide and located in the raceway, combined with the lever $m^4$ and means, substantially as described, to operate it to push the ejector into and remove a blank from the raceway, as set forth.

5. The raceway open at one side for the passage of the blank, combined with the ejector and its attached loose plate $m^8$, to operate substantially as described.

6. The rotating spindle, the rod $a$ therein and its attached spring-collet, combined with the ring-discharging device $a^6$ and spring $a^7$, substantially as described.

In testimony whereof I have signed my name to this specification in the presence of two subscribing witnesses.

CHARLES F. ROPER.

Witnesses:
F. J. DUTCHER,
ARTHUR H. BALL.